United States Patent [19]

Lionello

[11] 4,304,538
[45] Dec. 8, 1981

[54] FEEDING DEVICE FOR FEEDING STRIP BLANKS OF WAFER BISCUITS INTO MOLDS INTENDED FOR FORMING COATED WAFER BISCUITS

[76] Inventor: Vincenzo Lionello, P. Fontana, 6, Quinto Stampi-Rozzano (Milano), Italy

[21] Appl. No.: 64,864

[22] Filed: Aug. 8, 1979

[30] Foreign Application Priority Data

Mar. 14, 1979 [IT] Italy ............................. 20980 A/79

[51] Int. Cl.³ ............................................. A23G 1/26
[52] U.S. Cl. .................................. 425/126 R; 414/751
[58] Field of Search ......................... 425/126 R, 126 S; 414/782, 783, 751

[56] References Cited

U.S. PATENT DOCUMENTS

3,288,089 11/1966 Schott ................................. 425/126
4,203,937 5/1980 Lingl ................................. 264/261 X

*Primary Examiner*—Thomas P. Pavelko
*Attorney, Agent, or Firm*—Kalish & Gilster

[57] ABSTRACT

A feeding device for feeding wafer strip blanks to pour molds for producing coated wafer biscuits, in particular in multiple coated wafer biscuit production systems, comprising a feeding unit for wafer strips cut from an original wafer board, which feeding unit is composed of a plurality of reeds provided with means for picking up the cut wafer strips and linked to one another by means of pin elements and arranged to be movable with an accordion-like type of movement on a guiding and supporting member to reciprocate between a station where the original wafer board is cut into individual wafer strips and a station where the system pour molds are loaded into which the individual wafer strips are allowed to fall into respective seats provided in the molds. The feeding unit, in its closed position or position where the reeds lay close beside one another, has the same length as the original wafer board, and in its open position, the same length as the pour mold between the end seats of said mold. Also provided is a means operative to cause the reed assembly to open or close, as well as a means for synchronizing the reciprocating movement of the feeding unit with the mold movement.

12 Claims, 15 Drawing Figures

FEEDING DEVICE FOR FEEDING STRIP BLANKS OF WAFER BISCUITS INTO MOLDS INTENDED FOR FORMING COATED WAFER BISCUITS

BACKGROUND OF THE INVENTION

This invention relates to a feeding device for feeding strip blanks of wafer biscuits into molds intended for forming coated wafer biscuits, particularly in multiple coated wafer production systems or the like.

As is known, the commercial production of traditional wafer biscuits has been recently supplemented with a new type of wafer biscuit comprising two wafer strips which alternate, in a manner known per se, with cream products, the whole being then coated with a layer of chocolate such as to leave a slab of chocolate intermediate to the two strips. That type of wafer biscuit, or wafer candy, has enjoyed widespread acceptance by the consumer, and its demand is growing steadily.

On the other hand, that type wafer biscuits are formed in strip blanks of limited width, thereby their handling, which already was critical with traditional wafer biscuits or candies, is still more difficult and troublesome, owing both to the small size of the wafer strips and to the difficulty of picking them up manually after they have been cut.

It is current practice, in preparing chocolate coated wafer biscuits, to introduce the wafer biscuits into pouring molds—in general either manually, or by means of feeding devices which, however, cannot ensure continuity of operation and do not afford as high a processing rate as would be desirable. In addition to complex feeding devices of conventional design (DT-OS No. 1532375), wherein individual wafer strips are cut off a wafer plate or board by means of pressure knives or guillotine blades which retain the individual strips by frictional engagement, the strips being then ejected to their related molds, a device by this Applicant is also known (U.S. patent application Ser. No. 898,765, filed on Mar. 21, 1978), wherein the individual strips are inserted, following the cutting step, into the molds by application of a push force from a comb arranged to move on a feeding slide, the feeding action occurring by means of a feeding chute provided with fan-like arranged troughs.

In the first-mentioned device, the individual strips are acted upon in a rather coarse manner, such that additionally to creating biscuit crumbles in considerable amounts, frequent breaking and separation of the individual wafers occurs in the strips, thereby on one hand, a tendency has developed towards the use of creams possessed of strong adhesive properties, while on the other hand the intermittingly carried out feeding operation must be frequently interrupted for a clean-up.

In the Applicant's, or last-mentioned, device, by contrast, a more continuous operation is achieved, which is facilitated by the provision of openings for the removal of processing crumbles.

In actual practice, however, it has been found that even the last-mentioned device requires occasional clean-ups in order to remove cream deposits which have built up during the passage of the wafer strips along the sheet metal fillets that separate the feeding troughs from one another.

OBJECTS OF THE INVENTION

This invention sets out to provide a feeding device as mentioned in the preamble, which while avoiding the drawbacks and disadvantages of the conventional types, affords fast and reliable transport of the cut strips from the cutting station to the pour molds without requiring any pushing action or gripping of the wafer strips, and accordingly without forming crumbles, or causing the wafers to break and/or separate, as is instead the case with conventional devices.

It is further possible, according to the invention, to arrange that, as the wafer strips are picked up, a slight and uniform pressure is advantageously applied thereto, to further ensure full adhesion between the cream layers and the wafers.

This solution affords in all cases faultless operation at a high rate and continuous operation of the molds independently of the condition of the wafers which, being markedly hygroscopic, may exhibit varying consistency and dimensional characteristics depending on the storage conditions of the wafers to be processed.

Another advantage of the instant device resides in that, after a wafer biscuit has been fully coated with chocolate, it bears no visible marks left by the pick-up operation whereto it has been subjected, i.e. it can retain the exact external shape sought.

SUMMARY OF THE INVENTION

The feeding device for feeding wafer strip blanks to pour molds intended for forming coated wafer biscuits, particularly for use in multiple coated wafer biscuit production systems, or the like, is characterized in that it comprises a cut wafer strip feeding unit including a plurality of reeds with controllable pick-up means, said reeds being linked to one another in succession and movable accordion-like over a guide support, said guide support being mounted to reciprocate between the wafer board cutting station and the mold loading station in the system, said feeding unit having substantially the same length as the wafer board when closed, and the same length as the mold length between the end seats thereof when open, that means are provided for opening and closing said plurality of reeds, and means for synchronizing the reciprocating motion of said feeding unit with the mold motion, and means for controlling the pick-up means in said plurality of reeds.

Advantageously, according to the invention, the reeds of the feeding unit, which are provided in the same number as the half-seats of the molds to be filled, are associated together in pairs by means of pin elements which are associated, as the case may be, on one side in a fixed manner with one reed, and on the other side in a detented movable manner with a successive reed, one reed of said plurality of reeds which happens to be at the opposite end to the closing and opening means of the feeding unit being affixed to the support of said feeding unit.

According to a further aspect of this invention, there is provided a method of feeding wafer strip blanks to pour molds, being characterized in that, additionally to a conventional wafer strip cutting step, it comprises:

(a) a depositing step, preferably with concurrent application of a slight compressive action, of the feeding unit, while closed and with the wafer biscuit pick-up means disengaged, onto the wafer strips, already cut and still aligned one beside the other, from the original wafer board;

(b) an engagement step of the wafer biscuit pick-up means, with the feeding unit still closed;

(c) a raising step of the feeding unit while held closed, with the pick-up means being engaged, and subsequent shift of the feeding unit, with concurrent progressive accordion-like opening movement of the reeds;

(d) a lowering step of the feeding unit, while held open, at the movable molds, and disengagement, substantially with the feeding unit overlying the molds, of the pick-up means with resultant gravity fall of the wafer strips into their related seats;

(e) a raising step of the feeding unit and concurrent starting of the return stroke, repositioning of the pick-up means, and closure of the feeding unit.

Since in actual practice the gap between two half-seats in a multiple wafer seat differs from the gap separating two adjacent half-seats in two successive seats, the lengths of the reed-interconnecting pin elements will also be alternately different.

According to yet another aspect of the invention, the controllable wafer strip pick-up means comprise, for each reed in said plurality of reeds, plural pick-up needles, e.g. two such needles, provided respectively at the lower end of a respective rod-like element, the rod-like elements of each reed being affixed to a reciprocable pick-up head and accommodated in a respective through seating hole formed in a respective reed. The movement of such heads, which are advantageously carried on a common supporting rod, is accomplished through cylinder/piston units associated with the ends of said supporting rod, the same being secured to the same cross-member carrying the feeding unit.

BRIEF DESCRIPTION OF THE DRAWINGS

Further features, advantages and details of this feeding device for feeding wafer strip blanks, as well as of this method of feeding wafer strip blanks, will be more clearly understood from the description which follows of a preferred embodiment thereof, illustrated schematically, by way of example only, in the accompanying drawings, where.

DESCRIPTION OF THE PREFERRED EMBODIMENTS

Figure 1:
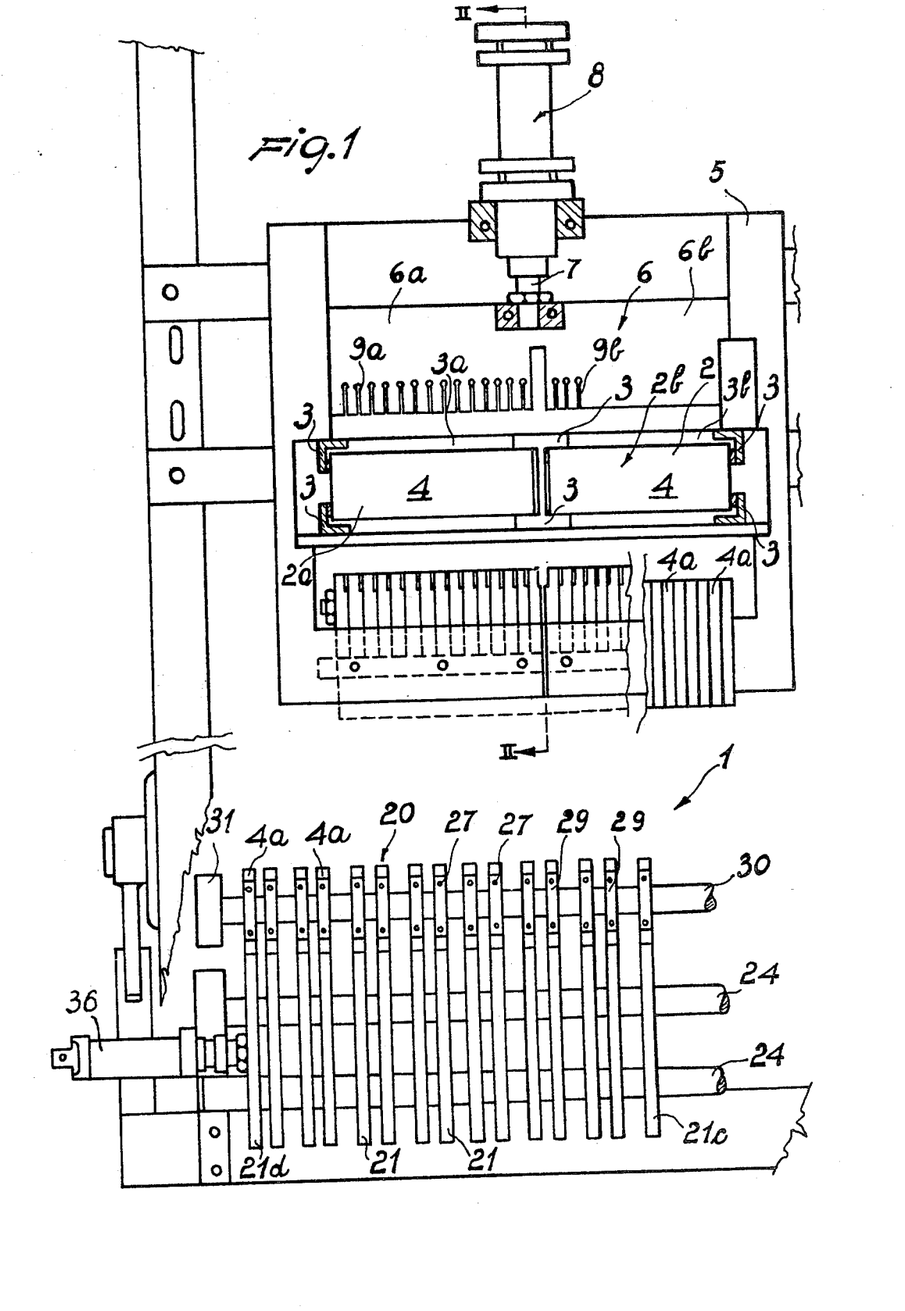
FIG. 1 is a partial top plan view of the feeding device according to the invention, some parts whereof are shown in section.
Figure 2:
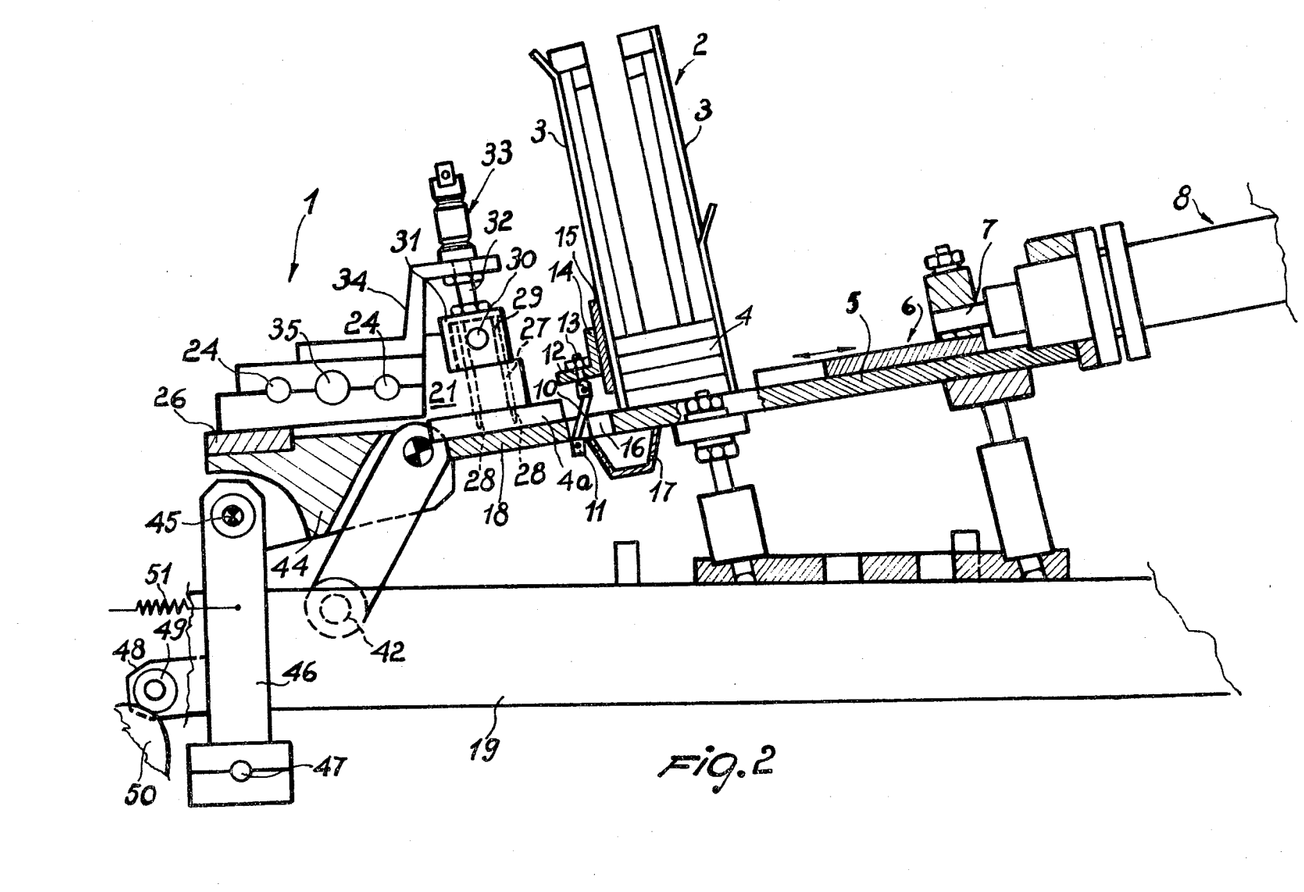
FIG. 2 is a cross-sectional detail view, taken along the line II—II, of the device shown in FIG. 1, wherein the feeding unit is represented as being positioned above the pre-cut strips, and the pick-up means are being actuated.
Figure 8:
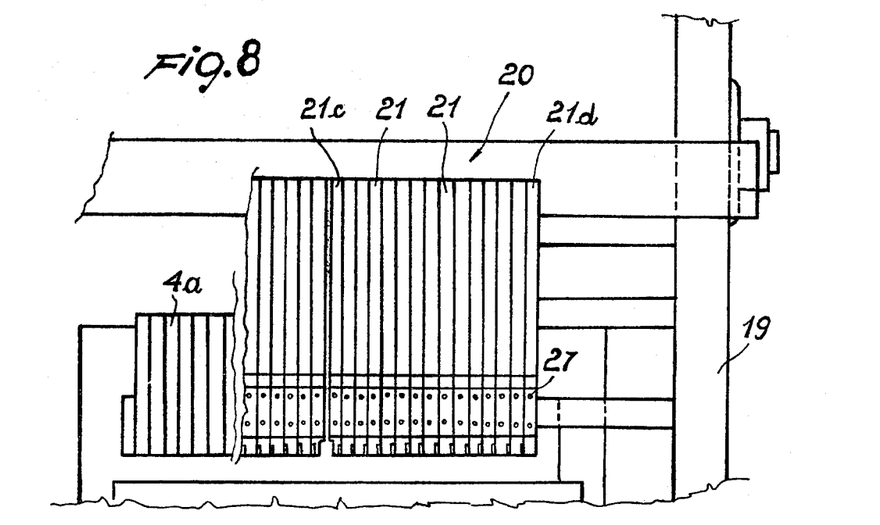
FIGS. 8 and 9 are partial top plan views of a feeding unit, respectively in its closed and open positions.
Figure 9:
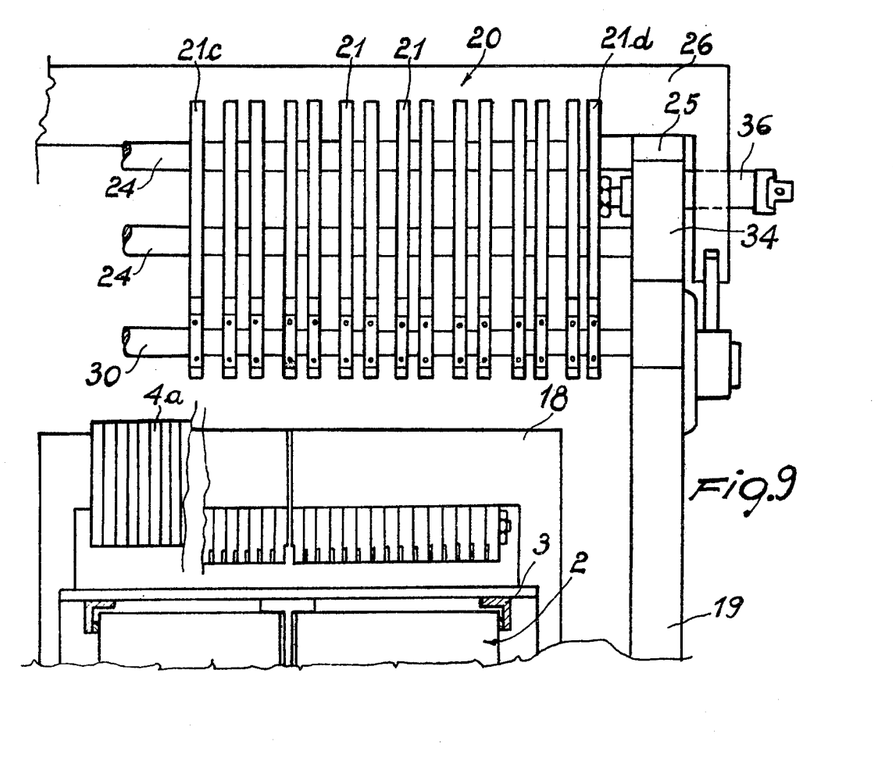
Figure 12:
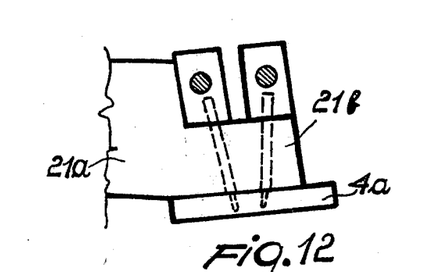
Figure 13:
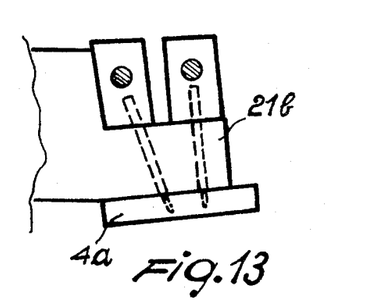
Figure 14:
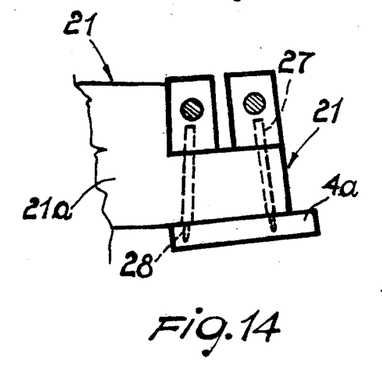

With reference to the drawing figures, which are to different scales, the device according to this invention is indicated generally at 1. In the top views of FIGS. 1, 8 and 9, for clarity's sake, although a double loader or loader of two rows of molds has been shown, only one feeding unit related to one double loader 2 has been represented in each case. The double loader 2 comprises two single loaders 2a, 2b, which have uprights 3 defining two chambers 3a, 3b accommodating a plurality of wafer biscuit boards 4 stacked one upon the other. The double loader 2 is positioned onto an inclined plane surface portion 5 which also receives a substantially channel-like plate 6 having portions 6a, 6b adapted for urging each time the lowermost wafer board 4 in the loader 2a, 2b, said plate being associated at the rear to a piston rod 7 of a cylinder/piston unit 8, advantageously of an air-operated or pneumatic type, and having at the front a plurality of slots formed therein with a discharge hole 9a, 9b, such slots being parallel to one another and allowing the plate 6 to be moved beyond a similar plurality of knives or cutting blades 10 located downstream of the loader 2 and being clamped between a lower support 11 and upper support 12 which is secured through an adjusting means, in the example shown a threaded rod or pin 13, to a common sectional member 14 attached to a cross-member 15 which is rigid with the loader 2. As is more clearly shown in FIG. 2, said blades 10 are passed through a corresponding slot 16 in the inclined surface 5, wherebelow a trough 17 is provided for collecting any crumbles formed during the cutting step. On the front, the inclined surface 5 forms, downstream of the blades 10, a loading station or zone 18. The inclined surface 5 is itself rigidly affixed to two stringers 19 of the production system through intermediate parts which are known per se and no further described herein.

The cutting of the individual wafer boards is carried out by pushing them through the blades 10 by means of the plate 6, said cutting action resulting in the formation of a plurality of wafer strips, or strip blanks, 4a being arranged one beside the other the overall length dimension of each strip being equal to that of each wafer board 4.

Figures 3, 10:
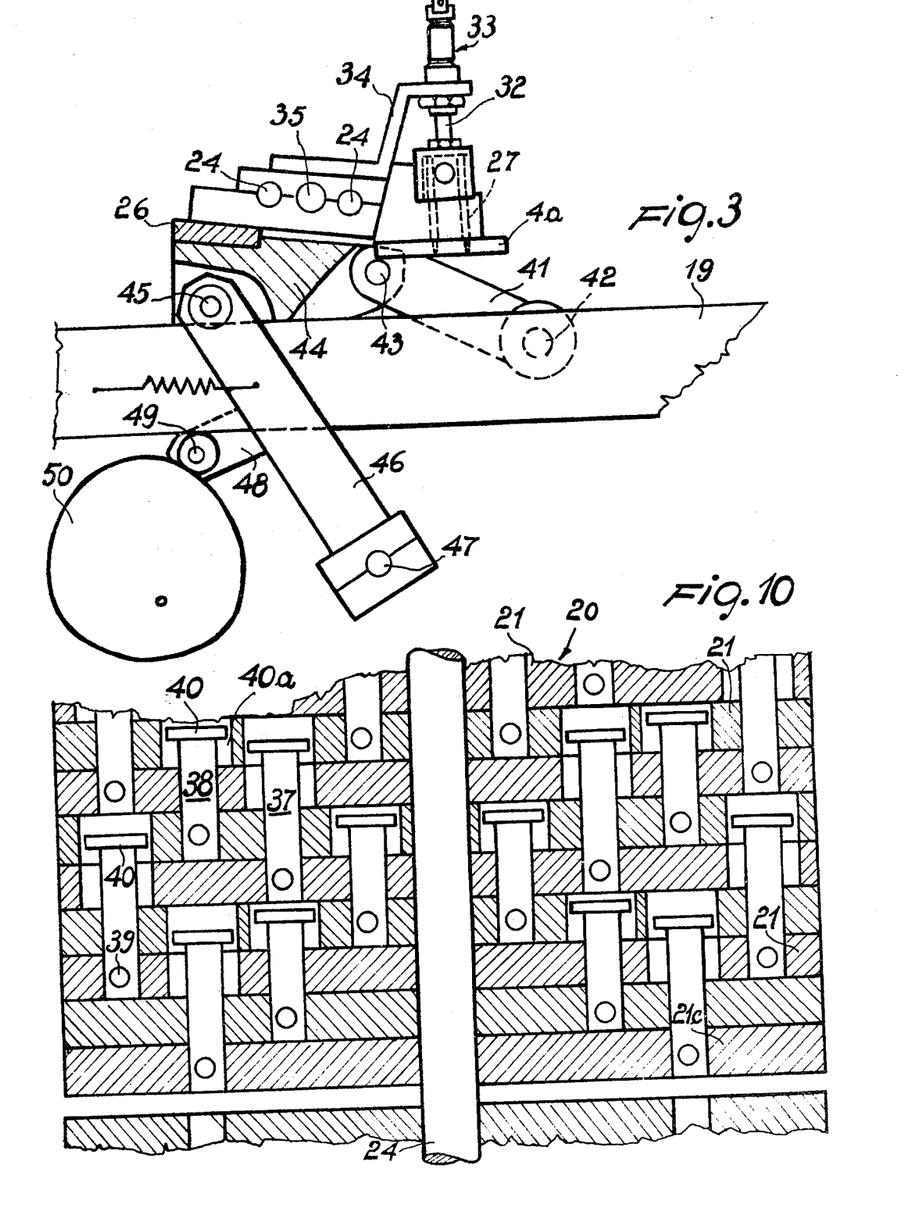
FIG. 3 is a detail view similar to FIG. 2, wherein the feeding unit is represented during the wafer strip transport step, means for synchronizing the feeding unit with the pour molds being also shown.
FIG. 10 is a cross-sectional view taken through a few adjacent reeds in a feeding unit according to the invention, in the closed position of the latter.

Up to this stage of the description, the device is already known from the cited Application by this Applicant. Between the loading station 18 and underlying pour molds which are movable continuously, the feeding of the wafer strips 4a is carried out, according to the invention, by means of a reed type of feeding unit, generally indicated at 20. The feeding unit 20 comprises a number of reeds 21 which corresponds to the number of half-seats 22a in a seat 22b, said reeds having when viewed in side elevation a body of substantially rectangular shape 21a formed with a front jut 21b. Two circular through hole seats 23 are provided, in the embodiment shown, in the body 21a for the purpose of accommodating two supporting rods 24 therein. The latter are carried in two ends of a side member 25 of a supporting cross-member 26, the cross-member 26 being attached at its outer ends to control and synchronization means which will be more fully explained hereinafter. Each reed 21 includes pick-up means comprising, in the embodiment shown, two stems 27 having at the bottom a needle 28, such stems being fixedly accommodated in a pick-up head 29 provided for each reed 21. The heads 29 are supported for free sliding movement on a guide rod or bar 30, which is carried at both ends by a support or holder 31 attached to the free end of the piston rod 32 of a respective cylinder/piston unit 33, preferably of the pneumatic type, said unit being secured to a related support 34, in turn attached to the cross-member 26. The innermost reed in the feeding unit 20 is indicated at 21c and is rigidly attached to the supporting rods 24 in a manner not shown. The outermost reed 21d is instead attached to the piston rod 35 of a preferably pneumatic cylinder/piston unit 36, also attached to the cross-member 26. The individual reeds 21, or 21c, 21d, are interconnected in the embodiment shown by two pin termination elements 37,38 which are attached as the case may be at one end, in the embodiment shown, by means of a pin 39, and have at the other end, passed respectively through one or two adjacent reeds, an embossment 40. The latter, with the unit 20 in its closed position, is received in a mating recess 40a provided in the reed confronting the embossment 40 being considered. That structure is shown in detail, to an enlarged scale, with reference to the cross-section of FIG. 10. Thus, by actuating the cylinder/piston unit 36, it becomes possible to close and open the feeding unit 20, the closing and opening movement thereof occurring in an accordion- or roll blind-like manner.

The feeding unit 20 performs a reciprocating movement between the loading station 18 and an unloading or discharge station which overlaps the underlying and moving molds, along a path which in the embodiment shown is elliptical, this being obtained by means of the articulation at the end of the cross-member 26 as explained hereinabove. The cross-member 26 is associated at its ends with a respective articulation comprising a first lever 41 fixedly pivoted at 42 to a respective stringer 19 of the system, and with its other end, at 43, to a member 44 whereto is also pivoted at 45 a second lever 46 which is secured with its other end to a cross-bar 47, said cross-bar being associated, with its other end, with an articulation similar to the one just described. A lever 46 has a jut 48 carrying a freely rotatable wheel 49 which engages with a curvilinear disk 50 keyed to a shaft which is associated with the drive for the molds. The reference numeral 51 denotes a tension spring effective to keep the wheel 49 in constant engagement with the curvilinear disk 50. As is clearly visible in FIG. 2, the end members 44 are affixed to the cross-member 26.

Figure 4:
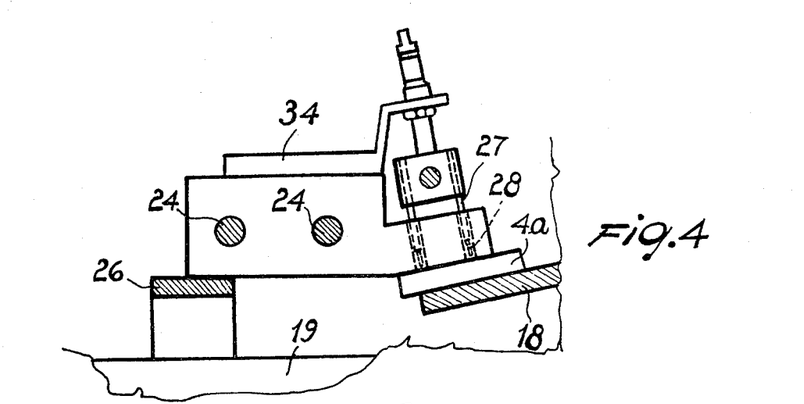
FIGS. 4 to 7 are similar detail views, in cross-section, illustrating the various steps of transporting the wafer strips.
Figure 5:
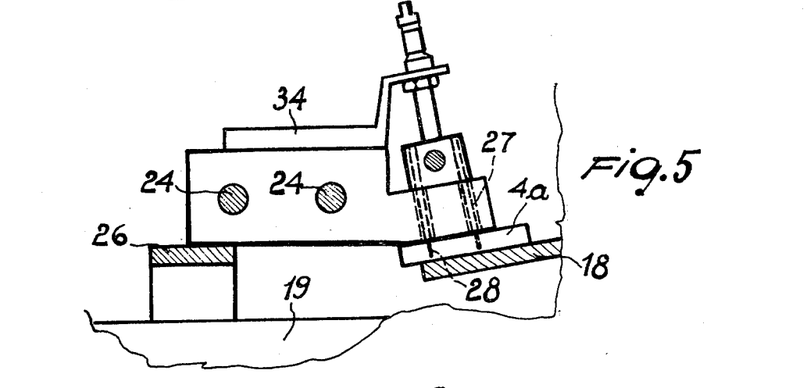
Figure 6:
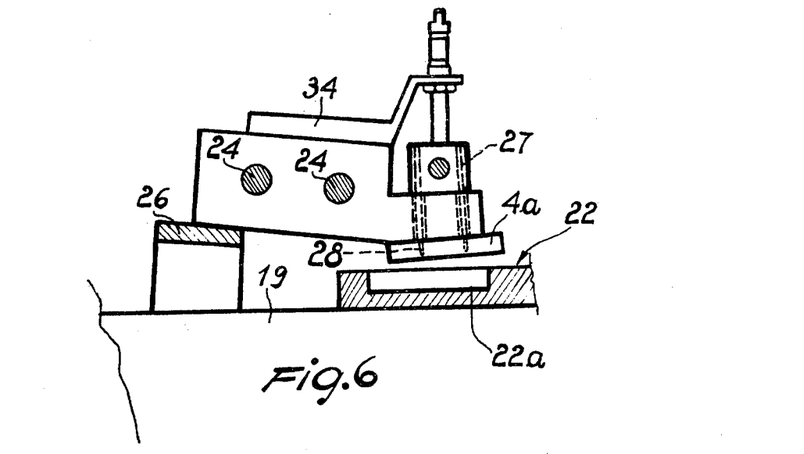
Figures 7, 11:
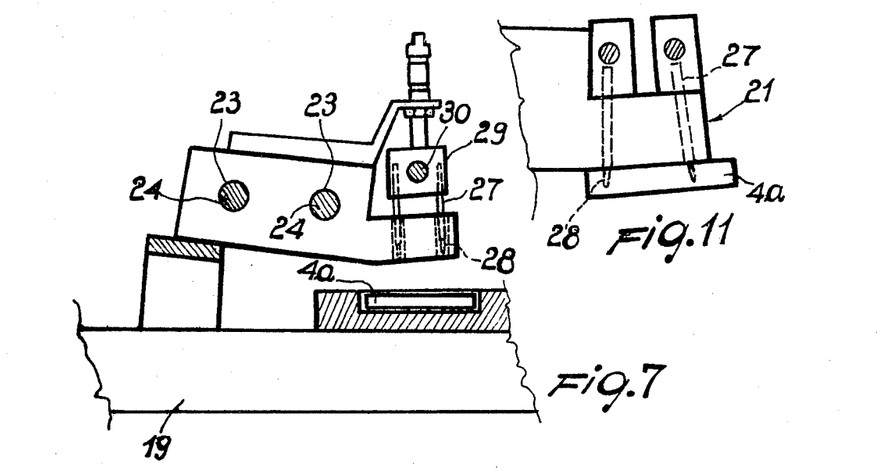
FIGS. 11 to 14 are elevational side detail views showing various embodiments of the pick-up means according to the invention.

The method according to this invention will be now described, starting with the known step of cutting the wafer boards 4 by pushing the same through the cutting blades by means of the plate 6. The feeding unit 20 is caused to rest, with its reeds 21 closed and the heads 29 raised, onto the cut wafer board, advantageously with concurrent application of a slight pressure force (FIG. 4). This is followed by the engagement of the pick-up means, or needles, 28, which are driven into the respective underlying wafer strips by the heads 29 being lowered by actuation of the cylinder/piston unit 33 (FIG. 5). Now, the transport movement proper takes place of the feeding unit 20 along a path which, in the embodiment shown, is elliptical. The wafer strips 4a remain firmly attached to their respective reeds owing to positive engagement of the same with the pick-up needles 28. The unit begins to move upwards, while still in the closed condition, and during the feed-in movement by actuation of the cylinder/piston unit 36, the feeding unit 20 is caused to open accordion-like while the feed-in movement continues, to approach the discharge location or station (FIG. 6). Soon afterwards, the cited discharge location for the wafer strips 4a into the molds is reached, that location corresponding substantially to a position of the juts 21b of the reeds 21 overlapping the underlying seats 22a of the molds. In this position, the wafer strips 4a are unloaded or fed by raising the heads 29 and withdrawing accordingly the needles 28 into the holes in the reeds, thereby the wafer strips 4a are caused to drop by gravity into the underlying seats 22a (FIG. 7). At this point, the feeding unit 20 starts along its return stroke to perform a feeding unit closure and repositioning movement, onto another wafer board precut into strips (FIG. 4).

It will be appreciated from the foregoing that the device and method according to this invention effectively achieve their objects and afford all of the advantages mentioned in the preamble.

The contour of the curvilinear disk 50 will be obviously selected such as to ensure perfect synchronization of the wafer strip feed-in movement of the reed set or feeding unit 20 with the travel movement of the molds 22, as well as with the reciprocating movement of the wafer board feeding and cutting plate 6. The means for adjusting the speed of the cylinder/piston unit 8 are known per se, and will not be further described herein. The shaft of the curvilinear disk 50 is connected, as mentioned, to the drive for the pour mold movement.

With the device proposed herein, the wafer strips are fed continuously into the pour molds at a high production rate in a continuous processing cycle. Moreover, with the pick-up method implemented by this device, any ordinary wafer biscuits can be handled because these will no longer require the use of special creams having setting/adhesive properties.

An added advantage is that the wafer strips reach their seats in the molds in an intact condition, namely neither frayed nor with missing wafer portions, thereby the resultant coated wafer biscuits or candies also exhibit a faultless form.

A further advantage of the solution set forth by this invention is that its implementation requires very little room or space, thereby it lends itself to utilization, in a very simple manner, on any type of coated wafer biscuit, or the like, production system.

Still another advantage afforded by the invention resides in the "flexibility" of the device proposed, i.e. its attitude to be employed for processing different biscuit sizes, following replacement of but a few parts thereof.

In order to ensure prevention of undesired droppings of individual wafer strips, the invention further provides for the pick-up needles 28 to be roughened over their outer surfaces.

FIGS. 11 to 14 illustrate modifications to the support for the pick-up means which provide for an either convergent, or divergent, or orthogonally inclined positioning of the pick-up needles, such as to further ensure a reliable engagement of the needles with their associated wafer strip, the heads being either single, as shown, or discretely divided with respective supporting rods or bars, it being indifferent whether such heads are attached at their ends to one or two cylinder/piston or the like units.

It will be obvious that the number of needles per head, or reed, may be greater than indicated, and that the needles may be either coplanar to one another or mutually offset.

In the case of exceptionally wide wafer strips, an alternative embodiment of the invention would also contemplate replacement of the needle pick-up means with suction or suction cup means.

In practicing the invention, individual components may be replaced by other technically and function-wise equivalent components; thus, for example, the supporting cross-member which carries the feeding unit may be differently constructed, or caused to follow a path other than elliptical; or a loading station could be provided to conform with a horizontal layout, etc., without departing from the scope of this invention.

While in the embodiments discussed reference has been made to pour molds, it will be appreciated that the invention could be applied instead to wafer biscuit or the like transporting grids or conveying belts for subsequent processing of the biscuits or the like products. Advantageously, each reed is made of a plastics material for food article processing, and in all cases the materials and dimensions, as well as the number of such reeds per feeding unit, or their geometry, may be selected as desired without departing from the invention scope.

Figure 15:
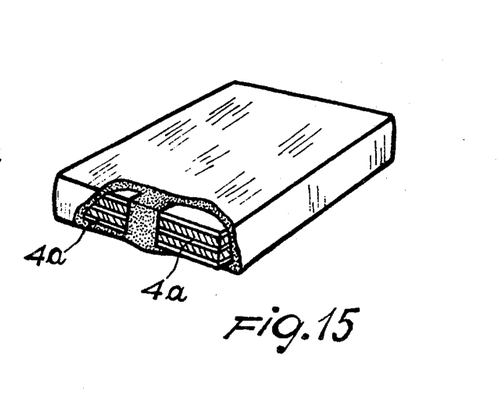
FIG. 15 is a perspective and partly sectional view of a multiple wafer being transported by means of the inventive device.

FIG. 15 illustrates a typical specimen of the multiple coated wafer biscuit to be produced with the invention.

All of the features that may be deduced from this description, drawings and claims are substantial to the invention, either individually or in any desired combination thereof.

I claim:

1. A feeding device for feeding strip blanks of wafer biscuits into molds intended for forming coated wafer biscuits, or onto conveying grids or belts, particularly in multiple coated wafer or the like candy production systems, characterized in that it comprises a cut wafer strip feeding unit including a plurality of reeds with controllable pick-up means, said reeds being linked to one another in succession and movable for opening and closing accordion-like over a guide support, said guide support being mounted to reciprocate between the wafer board cutting station and the mold loading station in the system, said feeding unit having substantially the same length as the wafer board when closed and substantially the same length as the mold length between the end seats thereof when open, means for opening and closing said plurality of reeds, means for synchronizing the reciprocating motion of said feeding unit with the mold motion, and means for controlling the pick-up means in said plurality of reeds, the reeds of said feeding unit being equal in number to the individual seats of said molds and associated to one another in pairs by means of pin elements, the length of the pin elements linking together in a slidable manner any two reeds in said feeding unit have a length selected for allowing, in the open position of said feeding unit, a gap between successive reeds corresponding to the gap between adjacent seats in said molds for receiving said wafer strips.

2. A feeding device for feeding strip blanks of wafer biscuits into molds intended for forming coated wafer biscuits, or onto conveying grids or belts, particularly in multiple coated wafer or the like candy production systems, characterized in that it comprises a cut wafer strip feeding unit including a plurality of reeds with controllable pick-up means, said reeds being linked to one another in succession and movable for opening and closing accordion-like over a guide support, said guide support being mounted to reciprocate between the wafer board cutting station and the mold loading station in the system, said feeding unit having substantially the same length as the wafer board when closed and substantially the same length as the mold length between the end seats thereof when open, means for opening and closing said plurality of reeds, means for synchronizing the reciprocating motion of said feeding unit with the mold motion, and means for controlling the pick-up means in said plurality of reeds, the reeds of said feeding unit being equal in number to the individual seats of said molds and associated to one another in pairs by means of pin elements, said pin elements being associated on one side, in a fixed manner, with one reed, and on the other side, in a detented movable manner, with a successive one of said reeds, the end reed opposed to the closing and opening means for said feeding unit being affixed to the support of said feeding unit.

3. A feeding device according to claim 1, wherein said guide support for said feeding unit comprises two rods adapted for supporting said reeds in a slidable manner, said rods being accommodated in two side members or the like of a cross-member, said cross-member being reciprocable between the wafer board pick-up or loading station and the mold loading station in the system.

4. A feeding device according to claim 1, wherein said cut wafer strip controllable pick-up means comprise, for each reed in said plurality, pick-up needles, provided respectively at the lower end of a respective stem-like element, the stem-like elements of each reed being secured to a reciprocable pick-up head and accommodated in a respective through hole seat formed in the respective one of said reeds.

5. A feeding device according to claim 1, wherein the means for opening said plurality of reeds comprise a preferably pneumatic cylinder/piston unit, said cylinder/piston unit being mounted to one side member of said cross-member of said feeding unit, the piston rod of said cylinder/piston unit being attached to the first one of said reeds adjacent said plurality of pick-up reeds.

6. A feeding device according to claim 1 wherein the length of the pin elements linking together in a slidable manner any two reeds in said feeding unit have a length selected for allowing, in the open position of said feeding unit, a gap between successive reeds corresponding to the gap between adjacent seats in said molds for receiving said wafer strips.

7. A feeding device according to claims 1 or 6, wherein recesses are provided in said reeds for accommodating, in the closed position of said feeding unit, abutment embossments of the reed connecting pins.

8. A feeding device according to claim 1, wherein the means operative to reciprocate the support of said feeding unit, as well as the means for synchronizing said feeding unit movements with the continuously movable molds comprise, on each side of the cross-member supporting said feeding unit, a substantially quadrilateral articulation or linkage mechanism, wherein the top side is formed by a side member, or portion, of said cross-member, and the bottom side pivot points are fixed on a respective stringer of the production system, one rocking lever of at least one of the two side linkages including a jut provided with a wheel and engaging a curvilinear disk, said curvilinear disk determining said synchronization of the feeding unit with the molds and being keyed to a shaft connected to the drive for said molds.

9. A feeding device according to claim 1, wherein said control means for said pick-up means on said reeds comprise pneumatic cylinder/piston units.

10. A feeding device according to claim 1, wherein said pick-up means is constituted by suction pick-up means.

11. A feeding device according to claim 1 or 4, wherein all of said reciprocable pick-up heads are mounted slidably to a common supporting rod, said common supporting rod being advantageously associated at its two ends with the piston rod of a preferably pneumatic cylinder/piston unit, said cylinder/piston unit being supported to the same cross-member carrying said feeding unit.

12. A feeding device according to claim 1 or 4 wherein said pick-up needles have their outer surface roughened, the needles in each reed being arranged relative to one another for reliable engagement with an associated cut wafer strip.

* * * * *